Figure 1:
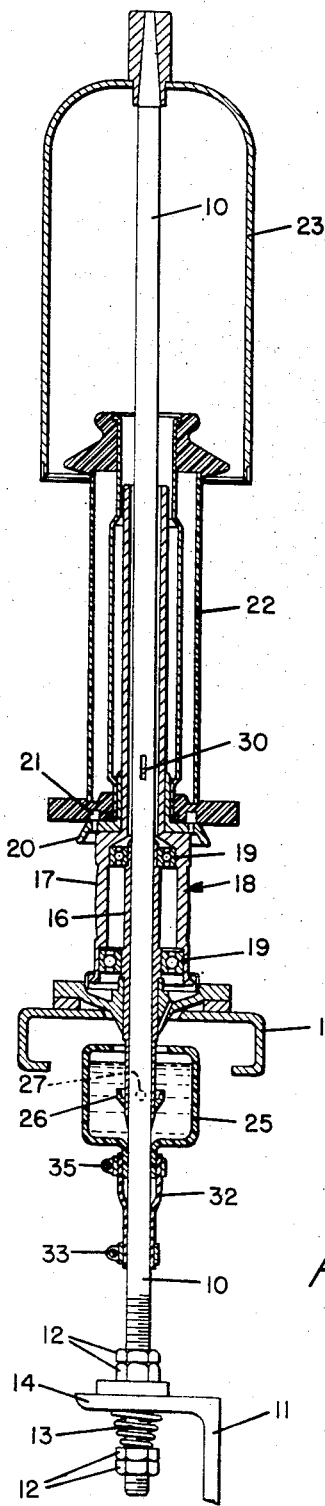

April 10, 1951     R. J. McCORMACK     2,548,675
VIBRATION DAMPENER FOR SPINDLE
LUBRICANT RESERVOIRS
Filed April 19, 1950

INVENTOR.
ROBERT J. McCORMACK
BY
ATTORNEY

Patented Apr. 10, 1951

2,548,675

UNITED STATES PATENT OFFICE 2,548,675

VIBRATION DAMPENER FOR SPINDLE LUBRICANT RESERVOIRS

Robert J. McCormack, Perry, Ohio, assignor to Industrial Rayon Corporation, Cleveland, Ohio, a corporation of Delaware Application April 19, 1950, Serial No. 156,807

3 Claims. (Cl. 57—133)

This invention relates to means for dampening vibration of a lubricant supplying reservoir for high-speed twisting spindles.

High speed spindles of the kind shown in the Bergmann et al. Patent No. 2,245,564 are supported at one end in a fixed position while a sleeve-type bolster including a whirl is moved up and down over a substantial portion during a thread twisting and collecting operation. The bolster is mounted on a reciprocating lifting rail the periodic motion of which within a cap lays the twisted thread or yarn on a bobbin in a desired pattern.

The Bergmann patent further discloses the provision of a lubricating reservoir positioned about the spindle and a lubricant distributing means in connection with the reciprocating bolster which lubricate the spindle and the bolster bearings. Due to the high speeds of rotation of the bolster about the spindle, of between 5000 to 8000 R. P. M., and because of inevitable machining imperfections in the construction of the spindle and its associated parts vibration is induced into the spindle and therefrom into the lubricant reservoir that is associated with the spindle. The induced vibration dissipates and throws out the lubricant from the reservoir.

There is provided by this invention a means for mounting the lubricant reservoir about the spindle which advantageously dampens the induced vibration of the lubricant reservoir. Additionally the vibration dampening means provides for a shock absorbing means for the reciprocating bolster should it descend beyond its return point in the lubricant well preventing injury to the reservoir and to the spindle bolster. The dampening means comprises a sleeve made of a resilient material such as of rubber, or of a suitable plastic having the qualities of a rubber-like material, placed about the spindle. The sleeve is secured to the spindle at one end and to the reservoir base at the other the reservoir being loosely positioned about the spindle. Being resilient the sleeve is adapted to vertical compression; while simultaneously it serves as an effective seal for the lubricant about the spindle and about the lubricant reservoir. The sleeve is adapted to dampen the spindle vibration from the lubricant reservoir. Because of its resilient qualities it serves, advantageously, as a shock absorber in the event that the bolster should descend into the reservoir well beyond its predetermined return point and physically contact the well base.

Figure 2:
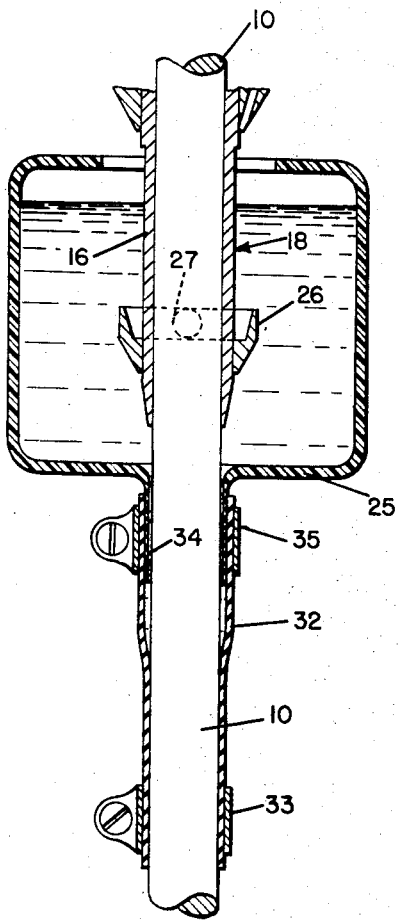

This invention is explained in greater detail in the following specification and in the accompanying drawing where:

Figure 1 represents, in elevation, a high speed spindle and the lubricant reservoir vibration dampening sleeve and support; and Figure 2 shows in greater detail a sectional elevation of the lubricant reservoir vibration dampening sleeve in position about the spindle supporting the spindle lubricant reservoir.

Figure 1 represents a cap twisting apparatus substantially as shown in the Bergmann Patent No. 2,245,564 spindle 10 of which is resiliently supported in a stationary base support 11 being secured thereto by means of threaded nuts 12 opposing each other in a manner so as to compress a spring 13 against the flange 14 of the support 11. A lifting rail 15, imparting a reciprocatory motion to the apparatus, supports a rotating bolster 18 which is slidably movable about the spindle 10. The bolster 18 is rotatably mounted about the spindle 10 on anti-friction bearings 19 contained within it and positioned about a sleeve 16, in a spaced relation. The exterior of the bolster, substantially within the length between the spaced bearings 19, forms a whirl 17 which receives a moving belt (not shown) for rotating the bolster. There is, further, attached to the bolster 18 a flange or spool support 20 having pins 21 over which there is positioned a spool 22 whereon is wound twisted yarn or thread. The yarn or thread is laid about the core of the spool 22 as the bolster is reciprocated within a cap 23 removably positioned on the spindle 10.

A lubricant reservoir 25 is provided to furnish a lubricant to the surface of the spindle 10 and to the anti-friction bearings 19. The reservoir is positioned below the bolster 18 about the spindle 10. To the base of the bolster 18 there is attached an annular cup 26 which is adapted to scoop up upon immersion into the lubricant of the reservoir 25 a sufficient quantity of the lubricant for the spindle and for the anti-friction bearings 19. The spindle is lubricated by oil from the cup through an opening 27 within the cup and through a recess 30 in the upper section of the spindle. When the bolster reaches its top position on the spindle 10 the lubricant from the cup 26 spills through the sleeve opening 27 into the spindle recess 30 from which it flows downwardly along the spindle to the bearings 19 thence back into the reservoir. Due to the high speeds of rotating spools 22 about the spindles and unavoidable inaccuracies in machining, manner of mounting the spindles 10, vibrations are induced not only into the stationary spindles but into devices positioned about them. The vibrations can acquire amplitudes great enough not only to prevent an adequate pick-up of the lubricant but they also cause a splashing out of the lubricant out of the reservoir where the reservoir 25 is attached directly to the spindle 10. The reservoir being secured to the spindle will vibrate along with it, the lubricant being thrown out. It is advantageous therefor to dampen or prevent the vibrations of the spindle that may be induced into lubricant reservoir 25, so as to provide for a continued and constant supply of lubricant to the moving spindle parts. Further the lubricant reservoir 25 is desirably mounted so that it will not be injured in the event that the annular oil cup 26 descends so as to contact its base.

There is shown in Figure 2 a sleeve 32 secured at one end to the spindle 10 by means of a strap 33 and at the other end to the extension 34 of the lubricant reservoir 25. The upper securing strap 35 is tightened sufficiently about the extension 34 of the lubricant reservoir 25 to prevent leakage while avoiding compressing of the extension 34 so as to bind it to the spindle. The reservoir is, thus, substantially free of the spindle 10 vertically moveable thereabout. The base strap 33 is drawn tightly about the sleeve 32 to the spindle 10 so that no lubricant is permitted to escape. In the event that the bolster descends into the liquid reservoir 25 so that cup 26 will contact the well base the tube will be merely compressed upon contact and no damage will result to any of the contacting parts. Spindle 10 vibrations are substantially prevented from reaching the reservoir and dampened by the sleeve 32. Advantageously, then, the sleeve provides a vibration dampener for the high speed spindle lubricant reservoir, and for a shock absorbing means of moving, contacting parts.

I claim:

1. A spindle lubricant holding vibration dampener comprising, a spindle, a lubricant holding means positioned about the spindle, a resilient sleeve about said spindle and attached to said spindle by one of its ends and to the lubricant holding means by its other end.

2. In combination, a spindle, a rotating reciprocating bolster about the spindle, means attached to the bolster at substantially its base for picking up a lubricant, a lubricant reservoir positioned about said spindle into which said means is adapted to descend, and a resilient sleeve positioned about the said spindle and secured thereto supporting said lubricant reservoir.

3. In a cap spinning apparatus, a spindle, a cap positioned on said spindle, a rotating bolster about said spindle reciprocating a yarn collecting package in said cap, a lubricant reservoir positioned about said spindle and being secured thereto, said reservoir being positioned below said bolster, a lubricant pick-up means on said bolster adapted to be immersed in the lubricant of said reservoir, and a resilient sleeve secured at one end to said spindle supporting said lubricant reservoir.

ROBERT J. McCORMACK.

No references cited.